(12) United States Patent
Kirsch et al.

(10) Patent No.: US 11,041,453 B2
(45) Date of Patent: Jun. 22, 2021

(54) METHOD AND AUXILIARY CONTROL UNIT FOR COLD START OPTIMIZATION OF AN INTERNAL COMBUSTION ENGINE

(71) Applicant: WEBASTO SE, Stockdorf (DE)

(72) Inventors: Christian Kirsch, Stockdorf (DE); Jörg Ruthenberg, Stockdorf (DE)

(73) Assignee: WEBASTO SE, Stockdorf (DE)

(*) Notice: Subject to any disclaimer, the term of this patent is extended or adjusted under 35 U.S.C. 154(b) by 0 days.

(21) Appl. No.: 16/336,291

(22) PCT Filed: Aug. 31, 2017

(86) PCT No.: PCT/EP2017/071880
§ 371 (c)(1),
(2) Date: Mar. 25, 2019

(87) PCT Pub. No.: WO2018/059870
PCT Pub. Date: Apr. 5, 2018

(65) Prior Publication Data
US 2019/0242317 A1    Aug. 8, 2019

(30) Foreign Application Priority Data

Sep. 30, 2016   (DE) .................. 10 2016 118 672

(51) Int. Cl.
| | | |
|---|---|---|
| *B60H 1/03* | (2006.01) |
| *F02D 41/06* | (2006.01) |
| *F02N 19/10* | (2010.01) |
| *F02D 41/22* | (2006.01) |

(52) U.S. Cl.
CPC .......... *F02D 41/068* (2013.01); *F02D 41/06* (2013.01); *F02D 41/061* (2013.01);
(Continued)

(58) Field of Classification Search
CPC ....... F01P 2037/02; F01P 11/16; F02N 19/10; F02D 41/064
(Continued)

(56) References Cited

U.S. PATENT DOCUMENTS

| | | | |
|---|---|---|---|
| 5,184,300 A | * | 2/1993 | Hara ..................... B60R 16/023 701/113 |
| 5,781,877 A | | 7/1998 | Rachel et al. |

(Continued)

FOREIGN PATENT DOCUMENTS

| | | |
|---|---|---|
| DE | 3032090 A1 | 4/1982 |
| DE | 10108182 A1 | 8/2002 |

(Continued)

*Primary Examiner* — Long T Tran
*Assistant Examiner* — James J Kim
(74) *Attorney, Agent, or Firm* — Quarles & Brady LLP

(57) ABSTRACT

The present invention relates to a method (100) for cold start optimization of an internal combustion engine (10) comprising: determining (110) a start of an engine preheating device (12); transmitting (115) a selected coolant temperature $T_{cool\_trans}$ to an engine control unit (14); and adapting (140) the selected coolant temperature $T_{cool\_trans}$ transmitted to the engine control unit (14) to a current coolant temperature $T_{coll\_current}$ during a time interval $\Delta t$ following the start of the internal combustion engine (10). The present invention further relates to an auxiliary control unit (22) which is configured to execute the method (100).

10 Claims, 2 Drawing Sheets

Figure 1:
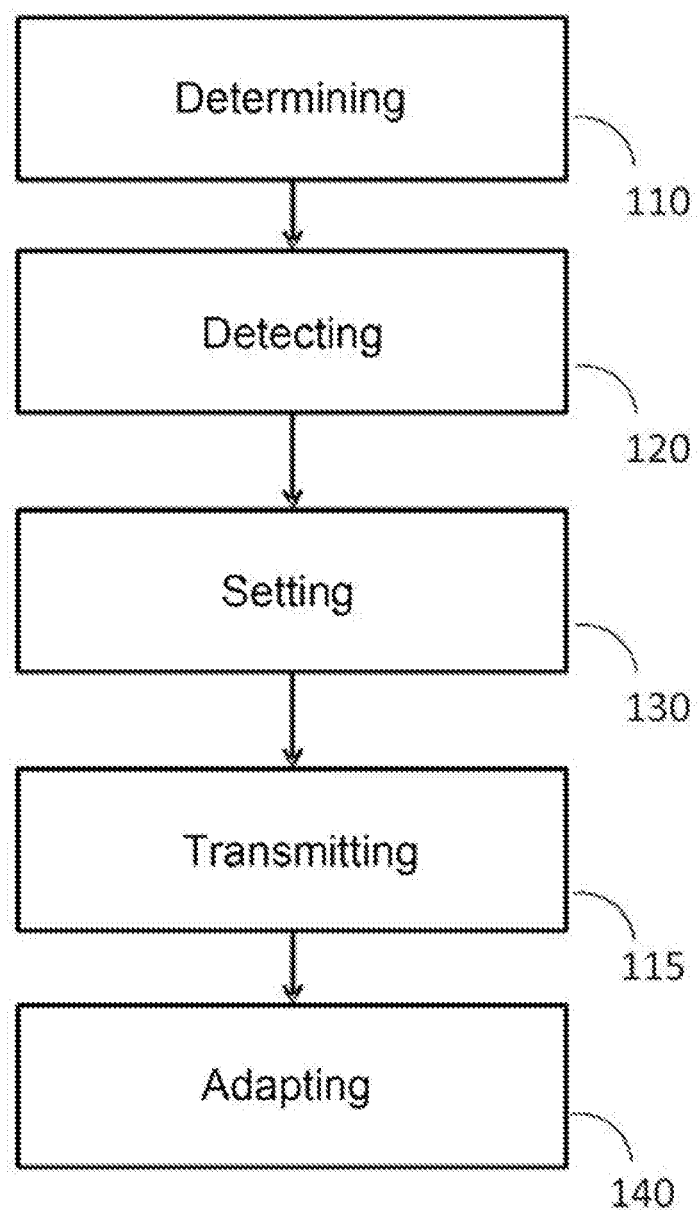

(52) U.S. Cl.
CPC ........... *F02D 41/222* (2013.01); *F02N 19/10* (2013.01); *F01P 2037/02* (2013.01); *F02D 2200/021* (2013.01); *F02D 2200/023* (2013.01); *F02D 2400/11* (2013.01); *Y02T 10/40* (2013.01)

(58) Field of Classification Search
USPC .................................................. 123/142.5 R
See application file for complete search history.

(56) References Cited

U.S. PATENT DOCUMENTS

| | | | | |
|---|---|---|---|---|
| 7,975,536 | B2* | 7/2011 | Bommer | F02N 19/10 |
| | | | | 73/114.68 |
| 8,763,577 | B2* | 7/2014 | Beckmann | F02D 41/062 |
| | | | | 123/179.21 |
| 2002/0099482 | A1* | 7/2002 | Reese, II | F01P 11/16 |
| | | | | 701/31.4 |
| 2002/0193921 | A1 | 12/2002 | Reese, II et al. | |
| 2004/0044462 | A1* | 3/2004 | Linenberg | F01P 11/20 |
| | | | | 701/113 |
| 2016/0265393 | A1* | 9/2016 | Fleszar | F01K 5/00 |

FOREIGN PATENT DOCUMENTS

| | | |
|---|---|---|
| DE | 102004008893 A1 | 9/2005 |
| DE | 102004055607 A1 | 5/2006 |
| FR | 2996168 A1 | 4/2014 |
| RU | 2293207 C1 | 2/2007 |

* cited by examiner

METHOD AND AUXILIARY CONTROL UNIT FOR COLD START OPTIMIZATION OF AN INTERNAL COMBUSTION ENGINE

CROSS-REFERENCE TO RELATED APPLICATIONS

This application represents the national stage entry of PCT International Application No. PCT/EP2017/071880 filed on Aug. 31, 2017, which claims the benefit of German Patent Application No. 10 2016 118 672.4 filed on Sep. 30, 2016, and the entire contents of each of these priority applications are incorporated herein by reference for all purposes.

The present disclosure relates to a method for cold start optimization of an internal combustion engine.

The present disclosure also relates to an auxiliary control unit for executing such a method.

Described is a method for cold start optimization of an internal combustion engine comprising: determining a start of an engine preheating device; transmitting a selected coolant temperature $T_{cool\_trans}$ to an engine control unit; and adapting the selected coolant temperature $T_{cool\_trans}$ transmitted to the engine control unit to a current coolant temperature $T_{coll\_current}$ during a time interval $\Delta t$ following the start of the internal combustion engine.

Modern internal combustion engines, especially those used in vehicles as primary propulsion engines, are subject to strict control and regulation by an engine management system usually integrated in the vehicle. This is necessary in order to operate the internal combustion engine in an optimal characteristic map, especially with regard to its consumption and exhaust gas values. As a result, the internal combustion engines are operated in an increasingly narrow inspection control window with respect to vehicle diagnosis that is inter alia with regard to an internal vehicle error control. This ensures that modern vehicle engines, even at different ambient temperatures, always have at least similar starting and operating conditions and, in particular, comply with prescribed exhaust values.

Such vehicle diagnostic functions perform a comparison between a currently measured cooling water temperature, air temperature, and oil temperature with values stored in the control unit during an engine cold start, among other things, and check the plausibility of the results. This check enables existing errors to be detected and the engine control unit can, for example, initiate an emergency operation of the internal combustion engine and save a corresponding error message. Under normal circumstances, the current coolant temperatures measured during a cold start are relatively close to an ambient temperature of the vehicle, for example in a range between –20=C and 30° C. If an engine preheating device is retrofitted to such a vehicle, for example in form of an auxiliary heater, which can preheat the internal combustion engine itself via the used coolant in addition to the interior of the vehicle, this vehicle diagnosis can be severely disturbed by the operation of the engine preheating device as a result of a greatly increased current cooling water temperature. A used coolant temperature sensor can, for example, detect a value of around 70° C., which the engine control unit interprets as a defect in the temperature sensor, since such a value is not plausible when the combustion engine is cold started.

In accordance with the disclosure, this can be prevented by transferring a selected coolant temperature $T_{cool\_trans}$ to the engine control unit when the internal combustion engine starts.

The engine control unit records and detects a plausible temperature value for the cold start of the combustion engine. In this way, an emergency operation of the internal combustion engine and an error entry in the engine control unit can be prevented. The subsequent adaption of the selected coolant temperature $T_{cool\_trans}$ transmitted to the engine control unit to a current coolant temperature $T_{cool\_current}$ during a time interval $\Delta t$ following the start of the internal combustion engine can keep the intervention in the motor management system, which occurs through the transmission of the modified temperature value, to a minimum. No additional changes or adjustments to the engine control unit are required. This is particularly advantageous when retrofitting the vehicle with an engine preheating device.

It may be provided that detecting a temperature T takes place when the engine preheating device starts. In this regard, it can be provided that setting of the selected coolant temperature $T_{cool\_trans}$ transmitted to the engine control unit occurs when the internal combustion engine starts in dependence of the detected temperature T. For example, the transferred selected coolant temperature $T_{cool\_trans}$ may differ from the detected temperature T by a fixed amount, e.g., 5° C. or 10° C. Thus, the resulting temperature difference, which must be compensated later, may be reduced or increased as required. In particular, it may be provided that setting of the selected coolant temperature $T_{cool\_trans}$ transmitted to the engine control unit to the temperature T detected when the engine preheating device starts takes place when the internal combustion engine starts. In this way, a plausible temperature is set in every conceivable operating condition.

Alternatively, it can also be provided that setting of the selected coolant temperature $T_{cool\_trans}$ transmitted to the engine control unit to a fixed value $T_{fix}$ takes place when the internal combustion engine starts. The usage of a fixed value $T_{fix}$ as the transmitted selected coolant temperature $T_{cool\_trans}$ is particularly easy and can be realized without any temperature measurement.

Usefully, it may be provided that the engine preheating device heats coolant of a cooling circuit of the internal combustion engine after its start and heats a vehicle interior with the aid of the heated coolant. The used engine preheating device can therefore be designed as a combined engine preheating device, which, in addition to the function of an engine preheating device, also performs the function of an auxiliary heating. It is also possible that the main function of the engine preheating device is the auxiliary heating function. This functionality can therefore also be easily retrofitted.

Usefully, it may be provided that the time interval $\Delta t$ begins with the start of the internal combustion engine. The start of the internal combustion engine can, for example, be precisely defined, determined and recorded by a corresponding control signal "start engine". For example, by recording the engine speed via the vehicle bus.

Furthermore, it may be provided that the time interval $\Delta t$ lasts a maximum of one minute, preferably between 10 seconds and 30 seconds. In this way, it can be ensured that the plausibility checks carried out by the engine control unit have been completed. Furthermore, an impermissible temperature increase of the coolant in the area of the internal combustion engine is also avoided in this way, for example, when the internal combustion engine has devices which are intended to cause a faster heating of the coolant in the area of the engine block.

Advantageously, it may be provided that adapting of the coolant temperature $T_{cool\_trans}$ transmitted to the engine control unit to the current coolant temperature $T_{cool\_current}$ takes place uniformly and linearly during the time interval $\Delta t$. The uniform and linear adjustment of the coolant temperature can easily be achieved, for example, by means of an adjustable electrical resistor via which a voltage value supplied by the temperatures sensor can be adjusted. The voltage value supplied by the temperature sensor can usually be regarded as representing the measured temperature.

Furthermore, it may be provided that adapting of the coolant temperature $T_{cool\_trans}$ transmitted to the engine control unit to the current coolant temperature $T_{cool\_current}$ takes place immediately when the current coolant temperature $T_{cool\_current}$ exceeds an admissible maximum value $T_{max}$. In this way, damaging the internal combustion engine by supplying a too low coolant temperature value to the engine control unit can be reliably prevented, which can be particularly advantageous in the presence of actual defects, such as insufficient coolant in the cooling circuit.

Further, an auxiliary control device configured to perform the method is described, wherein the auxiliary control unit realizes the advantages described in connection with the method.

The method described above is now explained by way of example with reference to the accompanying drawings on the basis of preferred embodiments.

The drawings show:

FIG. 1 a flow chart of an inventive method; and

Figure 2:
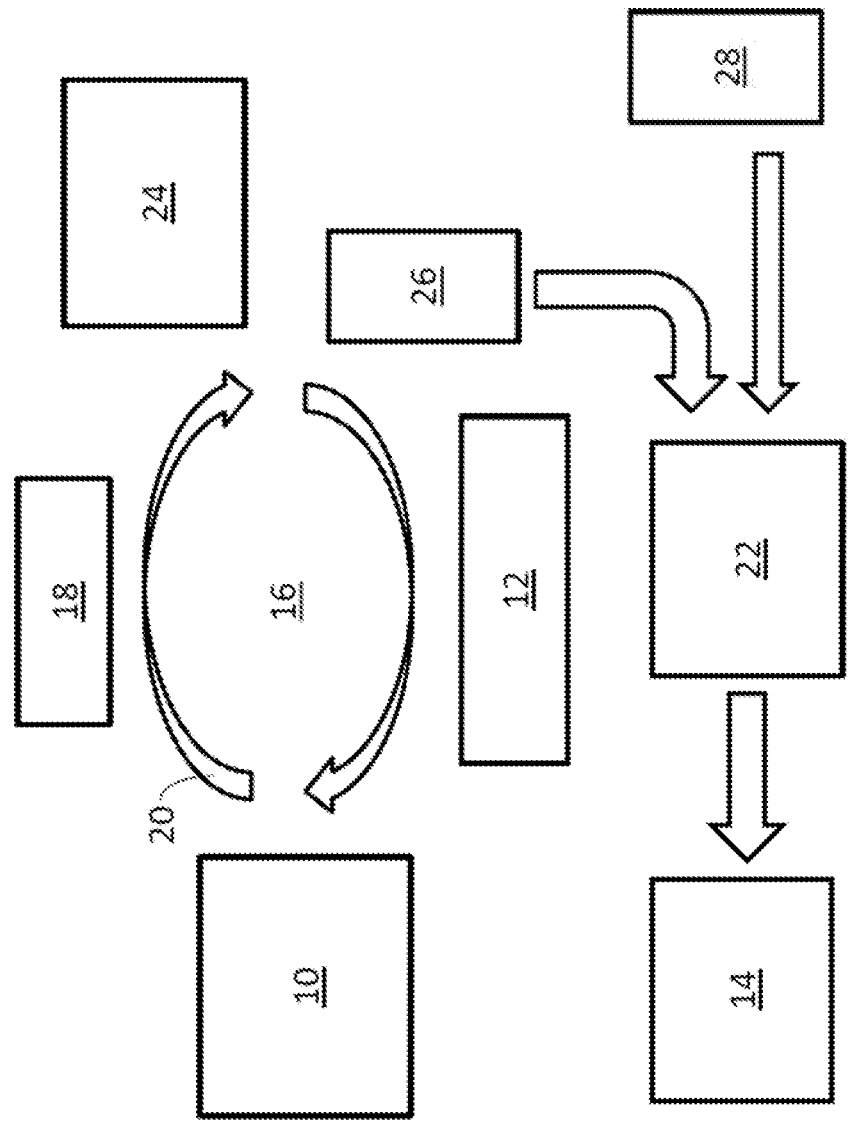

FIG. 2 a schematic representation of vehicle components involved in the method according to the disclosure.

FIG. 1 shows a flow chart of an inventive method. The method 100 according to the disclosure starts with the determining 110 of a start of an engine preheating device. The engine preheating device may, for example, be designed to preheat only an internal combustion engine of a vehicle, in particular a car or a truck, by means of the used coolant. The engine preheating device can additionally or primary have the function of an auxiliary heater, which also heats a vehicle interior with the aid of the heated coolant of the internal combustion engine.

Subsequent to detecting the start of the engine preheating device, detecting 120 of the temperature T can be optionally performed when the engine preheating device starts. For example, the detected temperature T may be an ambient temperature or a current coolant temperature when the engine preheating device starts. The ambient temperature and the current coolant temperature are usually almost the same when the internal combustion engine is cold started. Deviations between the ambient temperature and the current coolant temperature when the engine preheating device starts can optionally be used for errdiagnosis of the used temperature sensors by a device carrying out the method. Subsequent to the detecting 120 of the temperature T when the engine preheating device starts, a setting 130 of a selected coolant temperature $T_{cool\_trans}$ transmitted to the engine control unit to the temperature T previously detected when the engine preheating device starts can be performed. It is also possible to determine a fixed temperature $T_{fix}$ as the selected coolant temperature $T_{cool\_trans}$. It is also possible to determine the selected coolant temperature $T_{cool\_trans}$ to be transmitted as function of the temperature T previously recorded.

The engine control unit controls and regulates the operation of the internal combustion engine. Thus, the current coolant temperature is not transmitted to the engine control unit, but, for example, the temperature T recorded when the engine preheating device is started, which over time is significantly below a current coolant temperature $T_{cool\_trans}$ due to the operation of the engine preheating device. When the combustion engine is started, adapting 140 of the selected coolant temperature $T_{cool\_trans}$ transmitted to the engine control unit to a current coolant temperature $T_{cool\_current}$ takes place during a time interval $\Delta t$ following the start of the internal combustion engine. In this way, it is possible to prevent an error memory entry caused by an implausibly high coolant temperature and a possible emergency operation of the internal combustion engine due to a supposedly defective temperature sensor. When the adapting 140 of the temperature transmitted to the engine control unit has been completed, the method 100 ends and the engine control unit can control and regulate the operation of the internal combustion engine independently in the proven manner without further influence.

FIG. 2 shows a schematic representation of vehicle components involved in the method according to the present disclosure. Indicated is an internal combustion engine 10, an engine preheating device 12, a vehicle interior 18, a cooling device 24, and a sensor 26. A cooling circuit 16 with coolant 20 connects the above mentioned components to one another in a conventional manner, the coolant 20 being heated during operation of the internal combustion engine 10 and heat being discharged into the vehicle's environment at the cooling device 24, which represents the heat exchanger. A circulation of the coolant 20 in the cooling circuit 16 is indicated by the arrows. The coolant 20 can also dissipate a part of the heat absorbed by the combustion engine 10 to the vehicle interior 18 via a heat exchanger which is not explicitly shown. Further, the engine preheating device 12 can heat the coolant 20 independently of the internal combustion engine. The engine preheating device 12 can therefore be used to preheat both the combustion engine 10 and the vehicle interior 18. The sensor 26 is also in contact with the cooling circuit 16 and, as indicated, can transmit a recorded current coolant temperature to an auxiliary control unit 22. In addition or alternatively, the auxiliary control unit 22 can also receive an ambient temperature from a further sensor 28, which is detected by the further sensor 28. The auxiliary control unit 22 can modify the recorded temperature value(s) and forward them to an engine control unit 14 of the internal combustion engine 10. For example, the auxiliary control unit 22 can set a recorded temperature value T when the engine preheating device 12 starts and, independent from a current cooling temperature value $T_{cool\_current}$ of the coolant 20 during operation of the engine preheating device 12, transmit this temperature value T to the engine control unit 14 until the combustion engine 10 is started. The set value may be, for example, a fixed value $T_{fix}$ or a temperature value determined as a function of a temperature value T detected when the engine preheating device 12 starts.

By starting the internal combustion engine 10, a time interval $\Delta t$ can be started during which the auxiliary control unit 22 adapts the temperature value $T_{cool\_trans}$ transmitted to the engine control unit 14 to the current temperature value $T_{cool\_current}$ of the coolant. The adaption can, for example, be carried out continuously and linearly, the adaption can also be carried out rapidly, for example if the currently recorded temperature value $T_{cool\_current}$ of the coolant exceeds a fixed threshold value $T_{max}$. The initial setting and the adapting of the temperature value $T_{cool\_trans}$ transmitted to the engine control unit later on can be done, for example, by an adjustable ohmic resistor which modifies the voltage representing the temperature value. A variable resistor integrated in the auxiliary control unit 22 may, for example, be connected between the engine control unit 14 and the sensor 26 in case of auxiliary heating. Depending on the input parameters, the resistance value of the variable resistor can be adjusted such that the total resistance value of the sensor 26 and of the variable resistor corresponds to the resistance of the sensor 26 without heating by the engine preheating device. During the adjustment in the time interval Δt, the resistance value of the variable resistor can be reduced to 0 ohm so that the engine control unit detects the current temperature. When retrofitting the vehicle with the engine preheating device 12, the auxiliary control unit 22 can be easily inserted into the line connection between the engine control unit 14 and the sensor 26, 28, for example. Further modifications to the vehicle's electronic may not be necessary. When the engine preheating device 12 is inactive, the variable resistor will not affect the temperature sensing either. It is also possible to avoid an extensive modification of the cooling circuit 16, for example, a separation of the internal combustion engine 10 from the cooling circuit 16 via a shut-off valve during operation of the engine preheating device 12 as an auxiliary heater (isolated operation).

The features which are disclosed in the above description, in the drawings, and in the claims can be used for realizing the disclosed devices and methods both individually and in any combination.

REFERENCE NUMERALS 10 internal combustion engine
12 engine preheating device
14 engine control unit
16 cooling circuit
18 vehicle interior
20 coolant
22 auxiliary control unit
24 cooling device
26 sensor
28 further sensor
100 method
110 determining
115 transmitting
120 detecting
130 setting
140 adapting

The invention claimed is:

1. Method for cold start optimization of an internal combustion engine comprising:
   determining, by an auxiliary control unit, a start of an engine preheating device;
   transmitting, by the auxiliary control unit, a selected coolant temperature $T_{cool\_trans}$ to an engine control unit, wherein the selected coolant temperature $T_{cool\_trans}$ differs from a current coolant temperature $T_{cool\_current}$ during a time interval Δt following the start of the internal combustion engine; and
   adapting, by the auxiliary control unit, the selected coolant temperature $_{cool\_trans}$ transmitted to the engine control unit to the current coolant temperature $T_{cool\_current}$ during the time interval Δt following the start of the internal combustion engine.

2. Method according to claim 1, wherein detecting a temperature T takes place when the engine preheating device starts.

3. Method according to claim 2, wherein setting of the selected coolant temperature $T_{cool\_trans}$ transmitted to the engine control unit occurs when the internal combustion engine starts in dependence of the detected temperature T.

4. Method according to claim 3, wherein setting of the selected coolant temperature $T_{cool\_trans}$ transmitted to the engine control unit to the temperature T detected when the engine preheating device starts takes place when the internal combustion engine starts.

5. Method according to claim 1, wherein setting of the selected coolant temperature $T_{cool\_trans}$ transmitted to the engine control unit to a fixed value $T_{fix}$ takes place when the internal combustion engine starts.

6. Method according to claim 1, wherein the engine preheating device heats coolant of a cooling circuit of the internal combustion engine after its start and heats a vehicle interior with the aid of the heated coolant.

7. Method according to claim 1, wherein the time interval Δt begins with the start of the internal combustion engine.

8. Method according to claim 1, wherein the time interval Δt lasts a maximum of one minute, preferably between 10 seconds and 30 seconds.

9. Method according to claim 1, wherein adapting of the coolant temperature $T_{cool\_trans}$ transmitted to the engine control unit to the current coolant temperature $T_{cool\_current}$ takes place uniformly and linearly during the time interval Δt.

10. Method according to claim 1, wherein adapting of the coolant temperature $T_{cool\_trans}$ transmitted to the engine control unit to the current coolant temperature $T_{cool\_current}$ takes place immediately when the current coolant temperature $T_{cool\_current}$ exceeds an admissible maximum value $T_{max}$.

* * * * *

UNITED STATES PATENT AND TRADEMARK OFFICE
CERTIFICATE OF CORRECTION

PATENT NO. : 11,041,453 B2  
APPLICATION NO. : 16/336291  
DATED : June 22, 2021  
INVENTOR(S) : Christian Kirsch et al.

Page 1 of 1

It is certified that error appears in the above-identified patent and that said Letters Patent is hereby corrected as shown below:

On the Title Page

In The Abstract:  
Item (57), Line 8, "$T_{coll\_current}$" should be --$T_{cool\_current}$--.

In the Specification

Column 1, Line 25, "$T_{coll\_current}$" should be --$T_{cool\_current}$--.

Column 3, Line 67, "$T_{cool\_trans}$" should be --$T_{cool\_current}$--.

Signed and Sealed this  
Seventh Day of September, 2021

Drew Hirshfeld  
*Performing the Functions and Duties of the*  
*Under Secretary of Commerce for Intellectual Property and*  
*Director of the United States Patent and Trademark Office*